United States Patent [19]

Kawaguichi et al.

[11] Patent Number: 5,183,623
[45] Date of Patent: Feb. 2, 1993

[54] PROCESS FOR PRODUCING TRANSPARENT AND HEAT-RESISTANT POLYESTER CONTAINERS

[75] Inventors: Kuniaki Kawaguichi; Toshio Nakane; Akihide Shimoda; Kenji Hijikata, all of Shizuoka, Japan

[73] Assignee: Polyplastics Co., Ltd., Osaka, Japan

[21] Appl. No.: 770,051

[22] Filed: Oct. 4, 1991

[30] Foreign Application Priority Data

Oct. 17, 1990 [JP] Japan ................................. 2-280259

[51] Int. Cl.$^5$ ..................... B29C 47/88; B29C 51/02; B29C 51/10; B29C 71/02
[52] U.S. Cl. ............................. 264/544; 264/211.18; 264/235; 264/237; 264/553
[58] Field of Search ........... 264/210.2, 211.12, 211.18, 264/235, 237, 544, 571, 553

[56] References Cited

FOREIGN PATENT DOCUMENTS 59-5019  1/1984  Japan ................................. 264/235

*Primary Examiner*—Leo B. Tentoni
*Attorney, Agent, or Firm*—Nixon & Vanderhye

[57] ABSTRACT

A process for producing a transparent and heat-resistant container includes forming a sheet from a melt of a polyester resin having at least 80 mole % ester units derived from 1,3-propanediol and terephthalic acid or an ester-forming derivative thereof. The formed sheet is quenched and solidified so as to have relatively low crystallinity (i.e., less than 50%). The solidified low crystallinity film is then aged and shaped by thermoforming to obtain a container having relatively high crystallinity (i.e., greater than 50%, and preferably greater than 80%). The aging step is most preferably conducted at a temperature which satisfies the relationship represented by the following equation (1):

$$Ta \leq Tcc$$

wherein $Ta$ is the aging temperature (°C.), and $Tcc$ is the cold crystallization temperature (°C.) as determined by differential thermal analysis at a rate of temperature increase of 10° C./min. Moreover, the aging step is practiced such that the aged sheet satisfies the relationship represented by the following equation (2):

$$(\Delta Hcc)a \geq 5.0 \ (J/g)$$

wherein $(\Delta Hcc)a$ is the heat of cold crystallization (J/g) of the aged sheet as determined by differential thermal analysis at a rate of temperature increase of 10° C./min.

1 Claim, No Drawings

PROCESS FOR PRODUCING TRANSPARENT AND HEAT-RESISTANT POLYESTER CONTAINERS

RELATED APPLICATIONS

This application may be deemed to be related to co-pending and commonly owned U.S. patent application No. 07/584,329 filed on Sep. 19, 1990 (the entire content of which is expressly incorporated hereinto by reference).

FIELD OF INVENTION

The present invention generally relates to processes for producing polyester containers by thermoforming techniques. More specifically, the present invention relates to processes for producing polyester containers having high crystallinity and transparency properties, as well as thermal deformation resistance properties when exposed to high-temperature environments.

BACKGROUND AND SUMMARY OF THE INVENTION

Aromatic polyesters generally represented by polyalkylene terephthalates, such as polyethylene terephthalate (PET) and polybutylene terephthalate (PBT), are well known engineering resins that exhibit desirable chemical resistance, gas barrier and heat-resistance properties making them candidates for use as containers for food or chemicals. In this connection, sheets of aromatic polyesters may be thermoformed (e.g., vacuum-formed or pressure-formed) into suitable containers.

Although PET containers having excellent transparency may be obtained by thermoforming an unoriented amorphous PET sheet at temperatures which do not promote crystallization, the heat-resistance properties of such a container are less than desirable. For example, thermoformed transparent containers of amorphous PET typically deform when subjected to environments heated to 80° C. or more. In addition, when used in such high-temperature environments, the amorphous PET tends to crystallize thereby promoting shrinkage and/or a decrease in the container's transparency. As a result, the use of containers formed of amorphous PET resin are typically limited to low temperature environments.

To overcome the problems discussed immediately above, transparent PET sheets which have been crystallized by biaxial orientation have been used to form containers. However, thermoforming crystallized sheets of PET is relatively difficult owing to the biaxial orientation.

The temperature at which PET sheets are thermoformed may be increased so as to enhance the heat-resistance and mechanical strength properties of the resulting container. However, an increased thermoforming temperature brings the risks of promoting crystallization of the PET resin which, in turn, results in a more opaque ("whitened") appearance. Lowering the crystallization of PET resin by incorporating a comonomer into the polymeric chain could be envisioned, but such a proposal is typically not satisfactory for containers used in high temperature environments since the incorporated comonomer also tends to decrease the resin's mechanical characteristics, especially its heat-resistance properties.

Polybutylene terephthalate (PBT) resin, on the other hand, is generally difficult to form into a transparent sheet by quenching owing to its relative high rate of crystallization. Moreover, even if a transparent PBT sheet could be obtained, the PBT sheet exhibits poor thermoforming properties which typically prevents it from being shaped by thermoforming techniques into a container.

Copolymers prepared by incorporating other constituent comonomeric units into the PBT polymer chain tend to lower the crystallinity of the resin so that it exhibits enhanced transparency properties. However, this transparency tends to degrade over time to an opaque appearance in high temperature environments due to increased PBT crystallization which is promoted by such heat. Amorphous PBT copolymers, however, do not exhibit the desirable properties which are inherent with PBT resins generally, such as mechanical strength and heat-resistance properties, and therefore are not good candidates for forming containers to be used in high temperature environments.

What has been needed, therefore, is an aromatic polyester resin which exhibits exceptional mechanical and heat-resistance properties due to its highly crystalline structure, but also is highly transparent which could be thermoformed into containers useful in high temperature environments. It is towards fulfilling such a need that the present invention is directed.

Broadly, the present invention relates to processes for forming heat-resistant and transparent containers by subjecting a sheet made from a polypropylene terephthalate (PPT) resin to specific treatment conditions, and to the resulting heat-resistant and transparent containers thereby produced.

More specifically, the present invention is embodied in a process for producing a transparent and heat-resistant container by forming a sheet from a molten polyester resin having ester units derived from 1,3-propanediol and terephthalic acid or ester-forming derivatives thereof, quenching the sheet so as to form a solid resin sheet having low crystallinity, followed by aging and shaping the sheet by thermoforming under specified conditions so that the resulting container is highly (i.e., at least 50%, and more preferably at least 80%) crystalline. The polyester that is used in the practice of this invention is one comprised of ester units derived from 1,3-propanediol and ester-forming derivatives thereof and terephthalic acid in an amount of at least 80 mole% based on the entirety of the repeating units in the polymer chain.

Further aspects and advantages of the present invention will become more clear after careful consideration is given to the following detailed description of the preferred exemplary embodiments thereof.

DETAILED DESCRIPTION OF THE PREFERRED EXEMPLARY EMBODIMENTS

The starting material necessary for forming the terephthaloyl group in the polypropylene terephthalate employed in the practice of this invention is terephthalic acid or an ester-forming derivative thereof. Suitable derivatives, for example, include dialkyl esters and diacylates of terephthalic acid. Among these compounds, terephthalic acid and dialkyl esters thereof are preferable, with dimethyl terephthalate being particularly preferable.

The diol necessary for forming the propylene terephthalate unit of the polyester resin according to the present invention is 1,3-propanediol.

The polyester resin to be used in the present invention includes not only polypropylene terephthalate (PPT) homopolymers made essentially from those starting materials as described above, but also propylene terephthalate copolymers each comprising propylene terephthalate units in an amount of at least 80 mole % based on the entirety of the repeating units in the polymer chain. Suitable comonomers that may be employed include monobasic and polybasic carboxylic acids and derivatives thereof, hydroxy carboxylic acids and derivatives thereof, monohydric and polyhydric phenols and derivatives thereof, monohydric and polyhydric aliphatic (including alicyclic) alcohols and derivatives thereof, hydroxy amines and derivatives thereof, mono- and poly-amides and derivatives thereof, isocyanates and derivatives thereof, and isocyanurates and derivatives thereof. These comonomers may be used alone or as a mixture of two or more of the same.

The preferred comonomers are monobasic and polybasic carboxylic acids and derivatives thereof, monohydric and polyhydric phenols and derivatives thereof and monohydric and polyhydric aliphatic (including alicyclic) alcohols and derivatives thereof. Dibasic carboxylic acids and derivatives thereof, dihydric phenols and derivatives thereof and dihydric aliphatic (including alicyclic) alcohols and derivatives thereof are particularly preferred.

Specific examples of the dibasic carboyxlic acids include aromatic dicarboxylic acids such as isophthalic, orthophthalic, diphenic and 2,6-naphthalenedicarboxylic acids; aliphatic dicarboxylic acids such as adipic and sebasic acids; and alicyclic dicarboxylic acids such as 1,4-cyclohexanedicarboxylic acid. Examples of the dibasic carboxylic acid derivatives include dialkyl esters and diacylates of dibasic carboxylic acids, which may be used alone or as a mixture of two or more of the same. Among these derivatives, dialkyl esters are preferred with dimethyl esters being particularly preferable.

Dihydric phenols that may be used include aromatic dihydric phenols such as hydroquinone, 2,2-bis(4-hydroxyphenyl) propane, bis(4-hydroxyphenyl) sulfone, 4,4-diphenol, 4,4'-[1,4-phenylenebis(1-methylethylidene)] bisphenol ,bis(4-hydroxyphenyl) ether and 2,6-dihydroxynaphthalane. Examples of the dihydric phenol derivatives include adducts of dihydric phenols with two to four ethylene oxide molecules or two propylene oxide molecules. Adducts with two ethylene oxide molecules are particularly preferred.

Specific examples of dihydric alcohols include aliphatic diols such as ethylene glycol, 1,4-butanediol, 1,5-pentanediol, neopentyl glycol, 1,6-hexanediol and 1,10-decanediol; and alicyclic diols such as 1,4-cyclohexanediol, 1,4-cyclohexanedimethanol and tricyclodecanedimethanol.

One or more compounds selected from among trifunctional and higher compounds, such as trimethyl trimesate, trimethyl trimellitate, trimethylolpropane and pentaerythritol, and monofunctional compounds, such as stearyl alcohol and methyl o-benzoylbenzoate, may be used in the preparation of the polyester in such an amount as to promote the formation of a substantially linear copolymer. Furthermore, a small amount of a polyalkylene glycol, such as polybutylene glycol, may also be used to impart elasticity to the resulting resin.

According to the present invention, one or more compounds selected from among those described above may be used as the comonomer constituting the copolyester. It is necessary that the molar fraction of the comonomer based on the entirety of the constituent units be 20 mole % or less and preferably 15 mole% or less. When the comonomer molar fraction exceeds 20 mole %, the container produced by thermoforming the resulting copolyester will have an undesirably low relative crystallinity thereby exhibiting reduced mechanical strength and thermal deformation resistance properties. Moreover, the effect of aging (which will be described below) is deleteriously affected when the comonomer incorporation level exceeds 20 mole %.

The polyester resins used in the practice of the present invention can be prepared by interfacial polycondensation, melt polymerization or solution polymerization utilizing well-known condensation or transesterification techniques. The resin thus prepared may be further treated according to known solid phase polymerization processes wherein the resin is heated at a temperature below its melting point (e.g. preferably 10° to 50° C. below the resin melting point) under a reduced pressure or in an inert gas atmosphere to thereby give a product having an enhanced degree of polymerization.

The polyester resin according to the present invention is preferably one having a difference between the cold crystallization temperature and the glass transition temperature 65° C. or less, and more preferably 50° C. or less. A temperature difference of greater than 65° C. will significantly impair the aging step to be described below. The crystallization and glass transition temperatures as used herein and the accompanying claims are each determined by differential thermal analysis according to JIS Standard K 7121 at a rate of temperature increase of 10° C./min.

It is desirable with respect to processability that the polyester resin have an intrinsic viscosity of at least 0.7 or greater. As used herein, all intrinsic viscosity values are determined in o-chlorophenol at 25° C.

Depending upon the intended end-use application, the polyester resin may contain minor amounts of other thermoplastic resins or known additives that are conventionally added to thermoplastic resins, for example, stabilizers such as ultraviolet absorbers, antistatic agents, flame retardants, auxiliary flame retardants, coloring agents such as dyes, and pigments, lubricants, plasticizers, crystallization accelerators, nucleating agents and inorganic fillers. Of course, these additives should not be employed in amounts which would adversely affect the benefits achieved by the present invention.

The polyester resin prepared by the process described above is first shaped into an unoriented, low-crystallinity, transparent sheet by drying the resin, extruding the resulting resin into a sheet with an extruder fitted with an appropriately configured sheet-forming die (e.g., a T-die) and bringing the sheet into contact with a casting drum (chill roll) set at a sufficiently low temperature to thereby quench and solidify the sheet. Although polyester resin may be molded into a sheet using inflation or pressing techniques, T-die extrusion as described above is particularly preferred.

The formed sheet should not be too thick as non-uniform quenching would occur. That is, an excessively thick sheet is only quenched at its surface to form a transparent layer, while its interior region is gradually cooled to an opaque appearance. The resulting nonuniformly quenched thick sheet thereby exhibits poor shapability and impaired processability during thermoforming. On the contrary, too thin a sheet exhibits poor mechanical strength and thereby is unusable to form containers. The preferred thickness of the sheet to be used according to the present invention is therefore between 0.05 to 2.00 mm, and more preferably between 0.10 to 1.00 mm. The quenched sheet may be oriented minimally either monoaxially or biaxially at a low stretch ratio so as to achieve the desired thickness. However, it is preferred that the sheet remain unoriented. The relative crystallinity of the quenched sheet is preferably 50% or less.

According to the present invention, the low-crystallinity sheet is then aged at a temperature selected so as to satisfy the relationship represented by the following equation (1)

$$Ta \leq Tcc$$

wherein

Ta is the aging temperature (° C.); and Tcc is the cold crystallization temperature (° C.) of the resin as determined by differential thermal analysis according to JIS Standard K 7121 at a rate of temperature increase of 10° C./min.

This aging may be practiced by dipping the sheet in a heated fluid medium (such as warm water) at a predetermined temperature, heating the sheet in a dryer set at a predetermined temperature, blowing warm air against the sheet, and/or irradiating the sheet with infrared rays. The aging may be conducted at a constant temperature, or may be conducted by varying the temperature either stepwise or continuously.

When the aging temperature (Ta) is higher than the cold crystallization temperature (Tcc), the sheet is rapidly crystallized and thereby changes to an undesirable opaque appearance. On the other hand, too low an aging temperature prolongs the aging step thereby decreasing productivity. Accordingly, it is preferred that the aging temperature be practiced at 30° C. or greater.

The aging time varies depending upon the glass transition temperature (Tg) and cold crystallization temperature (Tcc) of the polyester resin, the temperature difference between the glass transition temperature (Tg) and the cold crystallization temperature (Tcc), the aging temperature (Ta) and the thickness of the sheet. Thus, a greater temperature difference between the glass transition temperature and the cold crystallization temperature, a lower aging temperature or a thicker sheet necessitate longer aging times. However, prolonged aging times promote excessive crystallization of the sheet thereby causing poor shaping and/or thickness non-uniformity during the subsequent thermoforming step. Accordingly, the aging must be conducted so as to give an aged sheet satisfying the relationship represented by the following equation (2):

$$(\Delta Hcc)a \geq 5.0 \ J/g$$

wherein $(\Delta Hcc)a$ is the heat of cold crystallization of the aged sheet in the untis Joules per gram (J/g) as determined by differential thermal analysis according to JIS Standard K 7121 at a rate of temperature increase of 10° C./min.

Preferably, the aged sheet satisfies the relationship $(\Delta Hcc)a \geq 10.0 \ J/g$. For example, with respect to a polypropylene terephthalate homopolymer sheet having a thickness of 0.4 mm, the preferred aging time is 0.5 hour at 50° C., 3.5 hours at 45° C. or 70 hours at 40° C.

After the sheet has been aged at a temperature selected so as to satisfy the relationship represented by the equation (1) for a time which satisfies the relationship represented by equation (2), the resulting sheet is thermally formed into a container having a desired shape by a conventional thermoforming process. The term "thermoforming" used in this specification and in the accompanying claims is intended to refer to well known forming processes, such as vacuum forming and pressure forming processes. Thus, the forming machines that may be used include vacuum forming machines, pressure forming machines, and universal forming machines utilizing both vacuum and pressure.

During the thermoforming step, the sheet is softened by preheating it to a temperature exceeding its glass transition temperature (Tg), and immediately thereafter causing the softened sheet to conform to the shape of a mold using vacuum and/or an elevated pressure. Care must be taken when preheating the sheet in preparation for the thermoforming step as too high a preheating temperature (i.e., a temperature greater than the cold crystallization temperature (Tcc)) causes the sheet to be crystallized thereby lessening its shapability and promoting thickness non-uniformly of the resulting container. Accordingly, the preheating temperature is preferably selected so as to be below the cold crystallization temperature (Tcc).

The temperature range for the mold cavity used during thermoforming is not particularly limited. However, a mold cavity temperature which is lower than the cold crystallization temperature (Tcc) plus 2° C. makes the production of a high-crystallinity container difficult and prolongs the required heating time. On the other hand, a high mold cavity temperature which is near the melting point (Tm) of the sheet lessens the sheet shaping properties, so that the sheet is liable to melt partially because of non-uniform thermal treatment. A higher mold cavity temperature, however, permits thermoforming to be accomplished with shorter cycle times and thereby allows increased production rates. Accordingly, it is desirable that the mold cavity temperature be lower than the melting point temperature (Tm) minus 5° C., and preferably less than the melting point temperature (Tm) minus 10° C. As used herein, the glass transition temperature Tg (° C.), cold crystallization temperature Tcc (° C.), and melting point temperature Tm (° C.), are each determined by differential thermal analysis according to JIS Standard K 7121 at a rate of temperature increase of 10° C./min.

Thermoforming the sheet under the conditions described above accelerates the crystallization of the sheet while retaining its high transparency. As a result, a container which exhibits both high transparency and high crystallinity is obtained. Moreover the transparency of the container is retained even when subjected to high temperature (e.g. greater than 150° C.) environments.

The relative crystallinity (CR) of the transparent and high-crystallinity container prepared by the thermoforming technique described above is preferably 50% or greater, and more preferably 80% or greater. If the relative crystallinity of the container is less than 50%, the container will exhibit poor high temperature resistance properties. Accordingly, it is preferred that the final product container have a relative crystallinity of 50% or above (more preferably 80% or above) and be sufficiently crystalline so that little (if any) change in the relative crystallinity occurs when the container is subjected to heated environments at a temperature of 150° C. or more.

The light transmittance value serves as an indicator of the transparency of a container. In this connection, the light transmittance value of the containers according to the present invention is preferably 80% or above. Furthermore, it is desirable during practical use that the containers retain a light transmittance as high as 80% or above even when the container is subjected to heated environments at a temperature of 150° C. or more.

The container produced by the process of the present invention has the following advantages:

(1) The containers are highly heat-resistant by virtue of their crystallinity being as high as 50% or above (preferably 80% or above) to exhibit high thermal deformation resistance even in an atmosphere heated to about 150° C, and have a light transmittance value as high as 80% or above. The containers are thus useful as food containers for microwave oven cooking (such as a microwavable trays) or so-called boil-in-bag containers whereby a visual inspection of the container contents may be accomplished during cooking. Furthermore, the container is suitable for containing objects that may be heat sterilized in situ and/or whereby the contents are placed into the container in a high-temperature state.

(2) The containers also exhibit desirable transparency without impaired mechanical characteristics. As a result, the containers of this invention are useful as protective containers (e.g., tamper-evident containers) which permit a consumer to visually inspect the contents.

The present invention will be described in more detail by means of the following non-limiting Examples.

EXAMPLES

The characterizing data in the Examples were obtained in the following manner:

(1) Propylene Terephthalate Content: determined by $^1$H-NMR using hexafluoroisopropanol-$d_2$ as a solvent.

(2) Intrinsic Viscosity: determined in o-chlorophenol at 25° C.

(3) Melting Point, Cold Crystallization Temperature and Glass Transition Temperature: determined by differential thermal analysis according to JIS Standard K 7121 at a rate of temperature increase of 10° C./min.

(4) Relative Crystallinity: A sheet was cut into a test piece for differential thermal analysis and was examined with a differential scanning calorimeter (DSC). The percent relative crystallinity (CR) was calculated according to the following equation:

$$CR = ((\Delta Hm - |\Delta Hcc|)/|(\Delta Hc)homo|) \times 100$$

wherein
  ΔHm: heat of melting as determined at a rate of temperature increase of 10° C./min (J/g).
  ΔHcc: heat of cold crystallization as determined at a rate of temperature increase of 10° C./min (J/g),
  (ΔHc)homo: heat of crystallization of unmodified polypropyleneterephthalate homopolymer in a molten state as determined at a rate of temperature increase of 10° C./min (J/g).
  Note: During heating of the test piece, melting of the crystals is initiated after the cold crystallization has progressed so that the absolute value of the heat of transition due to the cold crystallization (ΔHcc) must be subtracted from the heat of melting (ΔHm) in order to determine the relative crystallinity of the piece itself.

(5) Heat of Cold Crystallization: A sheet was cut into a test piece for differential thermal analysis. This test piece was examined by the differential thermal analysis according to JIS Standard K 7121 with a differential scanning calorimeter (DSC) at rate of temperature increase of 10° C./min.

(6) Light Transmittance: The light transmittance of a quenched sheet or an aged sheet was determined according to JIS Standard K 7105 with an integrating-sphere HTR meter, while that of a formed article was determined by cutting out a part of the side of the article and examining the resulting piece in a similar manner to that described above. A higher light transmittance is indicative of a higher transparency and lower opacity (i.e. whiteness).

The transparency was evaluated according to the following criteria:

| | |
|---|---|
| ⊚: very good | light transmittance: 90% or above |
| ○: good | light transmittance: 85% or above |
| Δ: somewhat good | light transmittance: 80 to 85% |
| x: bad | light transmittance: lower than 80% |

(7) Percent Shrinkage Factor: The percent shrinkage factor ($X_1$) during thermoforming was calculated according to the following equation:

$$X_1 = [V_m - V_c)/V_m] \times 100 \ (\%)$$

wherein
  $V_c$: internal volume of a cuplike product
  $V_m$: internal volume of a cavity mold The formability was evaluated according to the following criteria:

| | | |
|---|---|---|
| ⊚: very good | $0 \leq X_1 < 2.5$ | (%) |
| ○: good | $2.5 \leq X_1 < 5.0$ | (%) |
| Δ: somewhat good | $5.0 \leq X_1 < 7.5$ | (%) |
| x: bad | $7.5 \leq X_1$ | (%) |

(8) Percent Heat Shrinkage Factor: The percent heat shrinkage factor ($X_2$) was calculated according to the following equation:

$$X_2 = [(V_c - V_H)/V_c] \times 100 \ (\%)$$

wherein
  $V_c$: internal volume of a cup-like product,
  V: internal volume of a cup-like product heated in a fan dryer at 150° C. for 10 minutes.

The resistance to thermal shrinkage was evaluated according to the following criteria:

| | | |
|---|---|---|
| ⊚: very good | $0 \leq X_2 < 2.5$ | (%) |
| ○: good | $2.5 \leq X_2 < 5.0$ | (%) |
| Δ: somewhat good | $5.0 \leq X_2 < 7.5$ | (%) |
| x: bad | $7.5 \leq X_2$ | (%) |

(9) Light Transmittance and Relative Crystallinity of a Heated Container: A cuplike product was placed in a fan dryer set at 150 ° C. for 10 minutes, after which a part of the product was cut out and examined for light transmittance according to JIS K 7105 for relative crystallinity in the same manner as that described in item (4) above. The transparency was evaluated according to the same criteria as described in item (6) above.

PREPARATIVE EXAMPLE 1

(Synthesis of Polyester A)

329.6 parts by weight of dimethyl terephthalate, 258.0 parts by weight of 1,3-propanediol and a predetermined amount of a catalyst (titanium tetrabutoxide) were fed into a reactor fitted with a double-helical agitator and a distilling agent. After the reaction system had been fully purged with nitrogen, the contents were heated to 160° C. under normal pressure, followed by the initiation of agitation. The temperature of the contents was gradually raised to distill away the methanol formed as a by-product. After the temperature had reached 250° C., the pressure of the reactor was gradually reduced and the contents were agitated in a vacuum of 0.1 Torr for 3.5 hours to give a polypropylene terephthalate (PPT) resin having an intrinsic viscosity of 0.88.

The resulting polyester resin was pelletized and subjected to solid-phase polymerization in a nitrogen stream at 190° C. to give a polyester having an enhanced degree of polymerization and an intrinsic viscosity of 1.33. The obtained polyester was characterized with the results being given in Table 1.

PREPARATIVE EXAMPLE 2

(Synthesis of Polyester B)

311.5 parts by weight of dimethyl terephthalate, 231.9 parts by weight of 1,3-propanediol and 25.4 parts by weight of an adduct of 2,2-bis(4-hydroxyphenyl)propane with two ethylene oxide molecules were fed and polymerized in a similar manner to that of Preparative Example 1 to give a polypropylene terephthalate copolymer. This copolymer was subjected to solid phase polymerization and examined in a similar manner to that of Preparative Example 1. The results are given in Table 1.

PREPARATIVE EXAMPLES 3 AND 4

(Synthesis of Polyesters C and D)

Polypropylene terephthalate copolymers were prepared in the same manner as that of Preparative Example 2 except that 1,4-cyclohexanedimethanol in an amount specified in Table 1 was used instead of the adduct of 2,2-bis(4-hydroxyphenyl)propane with two ethylene oxide molecules. Each copolymer was then subjected to solid-phase polymerization and examined in a similar manner to that of Preparative Example 1. The results are given in Table 1.

COMPARATIVE PREPARATIVE EXAMPLE 1

(Synthesis of Polyester E)

The same procedures of polymerization, solid-phase polymerization and examination as those of Preparative Example 2 were repeated except that the amounts of the dimethyl terephthalic acid and adduct of 2,2-bis(4-hydroxyphenyl)propane with two ethylene oxide molecules were varied each as specified in Table 1. The results are given in Table 1.

COMPARATIVE PREPARATIVE EXAMPLE 2

(Synthesis of Polyester F)

A polybutylene terephthalate resin (PBT) was prepared by using 1,4-butanediol and dimethyl terephthalate each in a predetermined amount with the same equipment as that used in Preparative Example 1. This resin was subjected to solid-phase polymerization in a similar manner to that of Preparative Example 1 to give a resin having an intrinsic viscosity of 1.35.

EXAMPLES 1 TO 4 AND COMPARATIVE EXAMPLE 1

In order to illustrate how the characteristics of a vacuum-formed article vary depending upon the kind of the polyester used as a raw material, the polyesters A to E were evaluated under the same T-die molding conditions, the same sheet thickness and the same thermoforming conditions. That is, a starting polyester was dried in a fan dryer at 90° C. for 5 hours and extruded through a T-die having a width of 800 mm onto a chill roll of water cooling type set at 25° C. The obtained sheet had a thickness of 0.5 mm. A part of the sheet was cut out and examined for light transmittance. Separately, the sheet was aged in a thermostatic chamber at an aging temperature and for an aging time as specified in Table 2. The aged sheet was vacuum-formed into a cup having a depth of 45 mm and a diameter of 90 mm with a vacuum forming machine at a plug mold temperature of 80° C. and a cavity mold temperature of 100° C. (but 130° C. in Comparative Example 1) for a forming time of 10 seconds. A part of the side of each of the cups thus produced was cut out and the obtained pieces were examined for light transmittance and evaluated according to the methods described above. The results are given in Table 2.

COMPARATIVE EXAMPLE 2

Polyester F was molded into a sheet (thickness: 0.5 mm) in a similar manner to that of Example 1. This sheet whitened so significantly that it was unfit for thermoforming.

EXAMPLES 5 AND 6

A cuplike article was produced in the same manner as that of Example 1 except that the aging temperature was varied. The resulting article was evaluated with the results being given in Table 3.

EXAMPLES 7 AND 8 AND COMPARATIVE EXAMPLE 3

A cuplike article was produced in the same manner as that of Example 1 except that the aging time was varied. The article was evaluated with the results being given in Table 4.

TABLE 1

| Polymer No. | Prep. Ex. 1 A | Prep. Ex. 2 B | Prep. Ex. 3 C | Prep. Ex. 4 D | Comp. Prep. Ex. 1 E |
|---|---|---|---|---|---|
| DMT (pts. by wt.)*1 | 329.6 | 311.5 | 324.3 | 318.5 | 255.2 |
| 1,3-PD (pts. by wt.)*2 | 258.0 | 231.9 | 241.5 | 224.6 | 149.9 |
| EBPA (pts. by wt.)*3 | 0 | 25.4 | 0 | 0 | 106.0 |
| 1,4-CHDM (pts. by wt.)*4 | 0 | 0 | 11.9 | 23.3 | 0 |
| propylene terephthalate content (mole %) | 100.0 | 95.0 | 94.9 | 90.0 | 76.2 |
| intrinsic viscosity | 1.33 | 1.25 | 1.30 | 1.10 | 0.92 |
| Tg (°C.) | 40 | 46 | 42 | 43 | 55 |
| Tcc (°C.) | 66 | 78 | 69 | 74 | 125 |

TABLE 1-continued

| Polymer No. | Prep. Ex. 1 A | Prep. Ex. 2 B | Prep. Ex. 3 C | Prep. Ex. 4 D | Comp. Prep. Ex. 1 E |
|---|---|---|---|---|---|
| Tm (°C.) | 225 | 210 | 209 | 201 | 165 |

*[1] dimethyl terephthalate
*[2] 1,3-propanediol
*[3] adduct of 2,2-bis(4-hydroxyphenyl)propane with two ethylene oxide molecules
*[4] 1,4-cyclohexanedimethanol

TABLE 2

| Polymer No. | | Ex. 1 A | Ex. 2 B | Ex. 3 C | Ex. 4 D | Comp. Ex. 1 E |
|---|---|---|---|---|---|---|
| evaluation of quenched sheet | transparency | ⊚ | ⊚ | ⊚ | ⊚ | ⊚ |
|  | relative crystallinity (%) | 47.8 | 35.2 | 36.8 | 29.9 | 2.3 |
| aging condition | aging temp. (°C.) | 48 | 50 | 45 | 50 | 60 |
|  | aging time (min) | 45 | 60 | 60 | 75 | 75 |
| evaluation of aged sheet | transparency | ⊚ | ⊚ | ⊚ | ⊚ | ⊚ |
|  | (ΔHcc)a (J/g) | 29.8 | 31.0 | 30.1 | 31.2 | 12.6 |
| thermoforming condition | plug temp. (°C.) | 80 | " | " | " | " |
|  | cavity temp. (°C.) | 100 | " | " | " | 130 |
|  | forming time (sec) | 10 | " | " | " | " |
| evaluation of formed article | transparency | ○ | ○ | ○ | ○ | X |
|  | relative crystallinity (%) | 100 | 86.6 | 89.0 | 81.1 | 20.3 |
|  | formability | ○ | ⊚ | ○ | ⊚ | ○ |
|  | resistance to thermal shrinkage | ○ | ⊚ | ○ | ⊚ | X |
| evaluation of heated article (150° C. × 10 min) | transparency | ○ | ○ | ○ | ○ | X |
|  | relative crystallinity (%) | 100 | 86.7 | 89.3 | 81.3 | 20.5 |

TABLE 3

| Polymer No. | | Ex. 1 A | Ex. 5 " | Ex. 6 " |
|---|---|---|---|---|
| evaluation of quenched sheet | transparency | ⊚ | " | " |
|  | relative crystallinity (%) | 47.8 | " | " |
| aging condition | aging temp. (°C.) | 48 | 42 | 52 |
|  | aging time (min) | 45 | " | " |
| evaluation of aged sheet | transparency | ⊚ | ⊚ | ⊚ |
|  | (ΔHcc)a (J/g) | 29.8 | 30.9 | 22.0 |
| thermoforming condition | plug temp. (°C.) | 80 | " | " |
|  | cavity temp. (°C.) | 100 | " | " |
|  | forming time (sec) | 10 | " | " |
| evaluation of formed article | transparency | ○ | △ | ⊚ |
|  | relative crystallinity (%) | 100 | " | " |
|  | formability | ○ | ⊚ | ○ |
|  | resistance to thermal shrinkage | ○ | ⊚ | △ |
| evaluation of heated article (150° C. × 10 min) | transparency | ○ | △ | ⊚ |
|  | relative crystallinity (%) | 100 | " | " |

TABLE 4

| Polymer No. | | Ex. 1 A | Ex. 7 " | Ex. 8 " | Comp. Ex. 3 " |
|---|---|---|---|---|---|
| evaluation of quenched sheet | transparency | ⊚ | " | " | " |
|  | relative crystallinity (%) | 47.8 | " | " | " |
| aging condition | aging temp. (°C.) | 48 | " | " | —* |
|  | aging time (min) | 45 | 20 | 60 | — |
| evaluation of aged sheet | transparency | ⊚ | ⊚ | ⊚ | — |
|  | (ΔHcc)a (J/g) | 29.8 | 30.0 | 29.5 | — |
| thermoforming condition | plug temp. (°C.) | 80 | " | " | " |
|  | cavity temp. (°C.) | 100 | " | " | " |
|  | forming time (sec) | 10 | " | " | " |
| evaluation of formed article | transparency | ○ | △ | ⊚ | X |
|  | relative crystallinity (%) | 100 | " | " | " |
|  | formability | ○ | ⊚ | ○ | ⊚ |
|  | resistance to thermal shrinkage | ○ | ° | ○ | ⊚ |
| evaluation of heated article | transparency | ○ | △ | | X |
|  | relative crystallinity (%) | 100 | " | " | " |
| (150° C. × (%) 10 min) | | | | | |

*The quenched sheet was immediately subjected to thermoforming.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A process for producing a transparent and heat-resistant container which comprises the steps of:
   (a) forming a sheet from a melt of a polyester resin having at least 80 mole % of ester units derived form 1,3-propanediol and terephthalic acid or an ester-forming derivative thereof;
   (b) quenching and solidifying the sheet such that the solidified sheet has low crystallinity;
   (c) aging said quenched and solidified sheet so as to obtain a low crystallinity sheet; and then
   (d) thermoforming the resulting low crystallinity sheet to obtain a container, and wherein
   said aging step (a) is conducted at a temperature which satisfies the relationship represented by the following equations (1) and (2):

$$Ta \leq Tcc \qquad (1)$$

$$(\Delta Hcc)a \geq 5.0 \qquad (2)$$

wherein Ta is the aging temperature (° C.), Tcc is the cold crystallization temperature (° C.), and (αHcc)a is the heat of cold crystallization (J/g), said cold crystallization temperature and said heat of cold crystallization each being determined by differential thermal analysis at a rate of temperature increase of 10° C./min; and wherein said polyester resin satisfies the relationship represented by the following equation (3):

$$Tg + 65 \geq Tcc \qquad (3)$$

wherein Tg is the glass transition temperature (° C.) of the polyester resin as determined by differential thermal analysis at a rate of temperature increase of 10° C./min, and Tcc is as defined previously.

* * * * *

UNITED STATES PATENT AND TRADEMARK OFFICE
CERTIFICATE OF CORRECTION

PATENT NO. : 5,183,623
DATED : February 2, 1993
INVENTOR(S) : KAWAGUCHI et al It is certified that error appears in the above-identified patent and that said Letters Patent is hereby corrected as shown below:

Title page, under "United States Patent" change "Kawaguichi et al" to --Kawaguchi et al--;

Title page, after "[75] Inventors:" change "Kuniaki Kawaguichi" to --Kuniaki Kawaguchi--.

Column 1, line 45, change "are" to --is--.

Column 3, line 45, change "2,6-dihydroxynaphthalane" to --2,6-dihydroxynaphthalene--.

Column 5, line 56, after "the" (second occurrence) change "untis" to --units--.

Column 7, line 17, after "as" delete "a".

Signed and Sealed this

Fourth Day of January, 1994

Attest:

BRUCE LEHMAN

*Attesting Officer*   Commissioner of Patents and Trademarks